Jan. 19, 1943.  E. W. DAVIS  2,308,864
LUBRICATING APPARATUS
Filed June 30, 1939  2 Sheets-Sheet 1
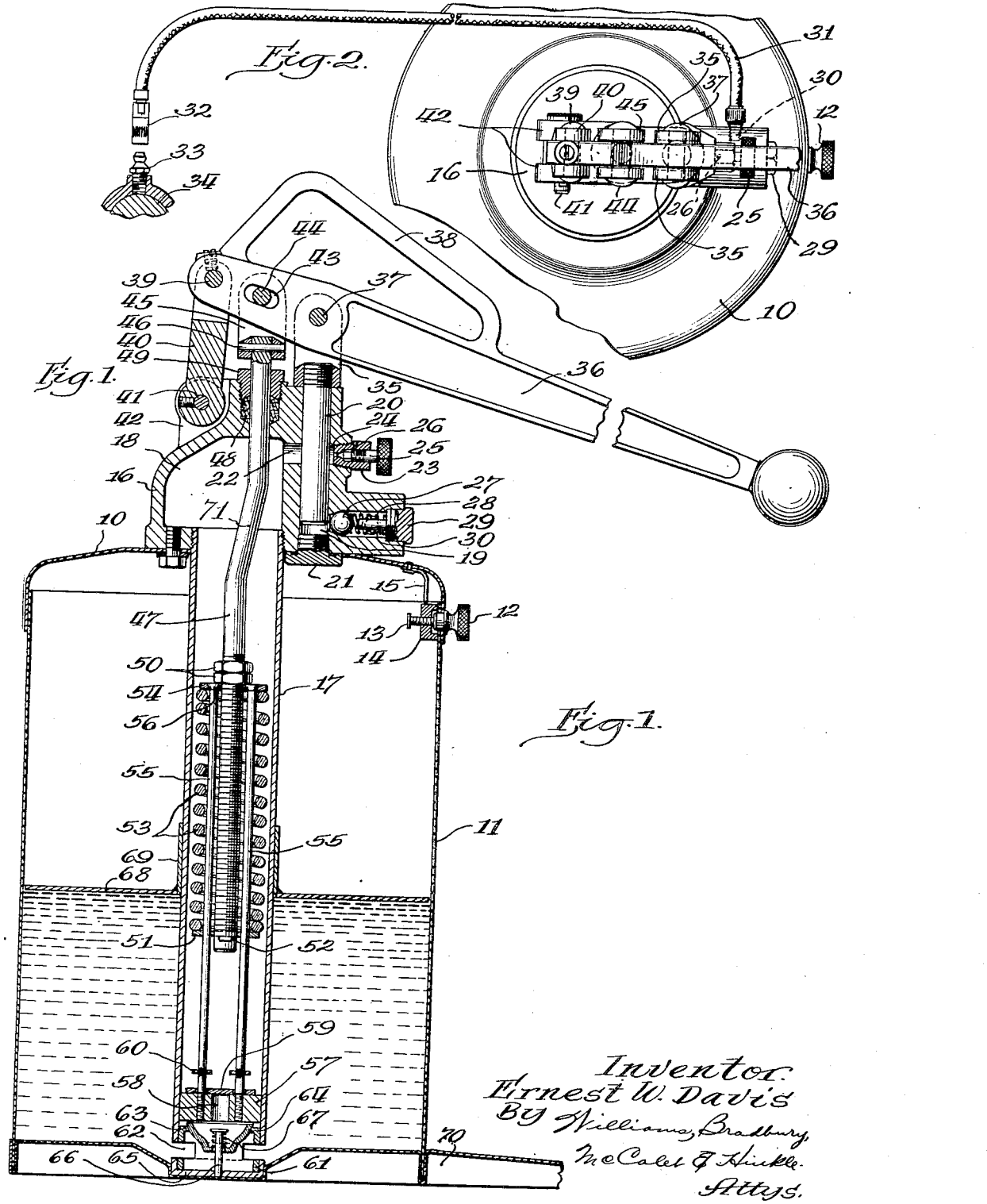

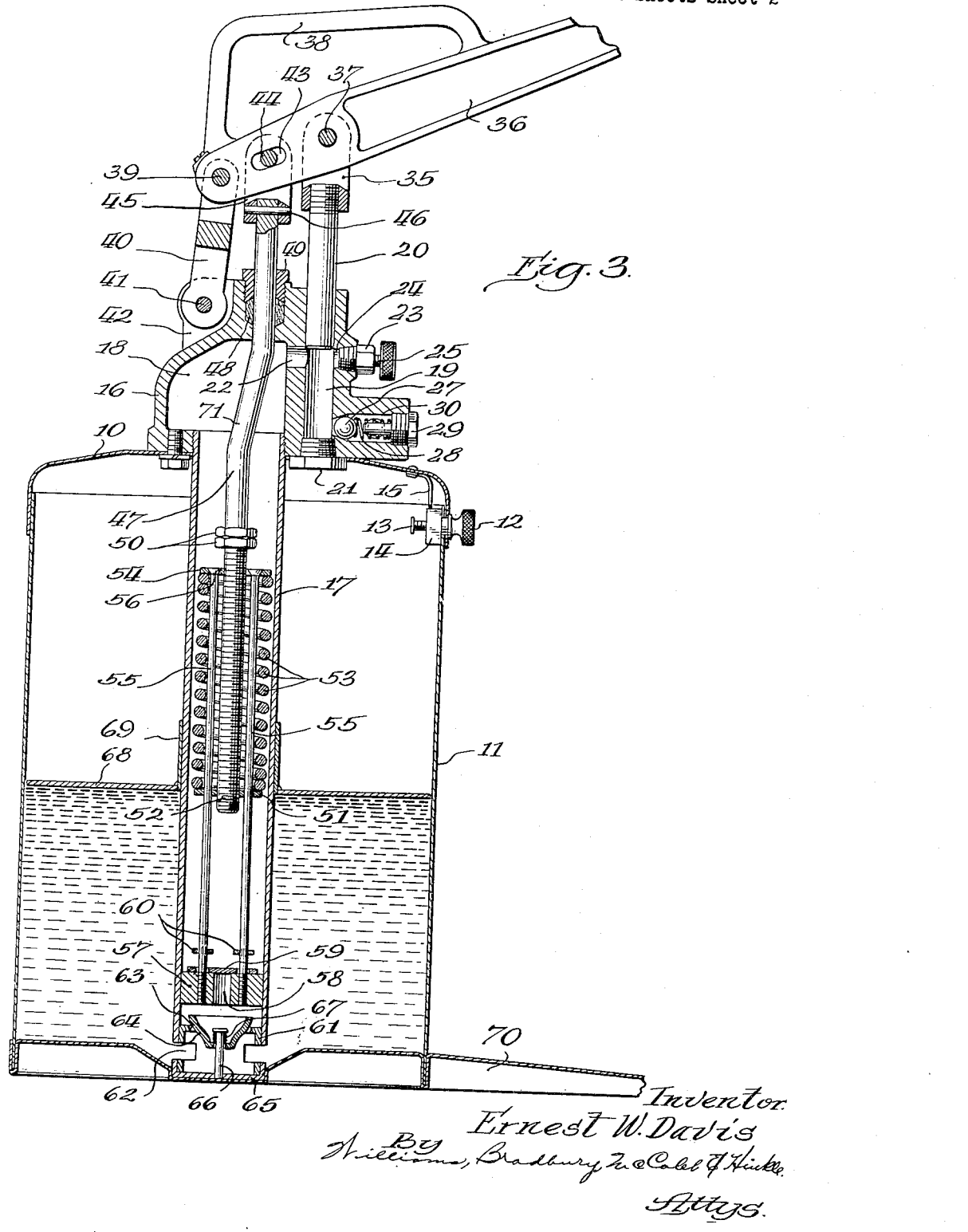

Patented Jan. 19, 1943

2,308,864

UNITED STATES PATENT OFFICE 2,308,864

LUBRICATING APPARATUS

Ernest W. Davis, Oak Park, Ill., assignor to Stewart-Warner Corporation, Chicago, Ill., a corporation of Virginia Application June 30, 1939, Serial No. 282,051

5 Claims. (Cl. 103—5)

My invention relates generally to lubricating apparatus, and more particularly to improvements in hand operated high pressure lubricant compressors, and in the means for priming the high pressure cylinders thereof.

It is an object of my invention to provide a high pressure lubricant compressor which may be attached to a lubricant containing reservoir and which will be effective in withdrawing all of the lubricant from the reservoir.

Another object of my invention is to provide improved means for conveying lubricant to the pumping cylinder of a lubricant compressor.

A further object of my invention is to provide a high pressure lubricant compressor having improved priming means.

Other objects of my invention will be apparent from the following description, and the accompanying drawings, in which similar characters of reference indicate similar parts throughout the several views, and in which Fig. 1 is a central, vertical, sectional view of the lubricant compressor;

Fig. 2 is a fragmentary plan view of the lubricant compressor; and

Fig. 3 is a view similar to Fig. 1, certain parts being shown in different position.

The compressor of my invention is adapted to be secured directly upon a cover 10 which rests upon a lubricant containing drum or reservoir 11. Cover 10 is conveniently secured on reservoir 11 by means of thumb screw 12 having a shank 13, which is threaded in a nut 14. The nut 14 is held relative to cover 10 and in alignment with a vertical slot in the side wall of reservoir 11, by a depending spring wire 15 which is riveted or otherwise secured to cover 10, and welded or soldered to nut 14. Thus when the cover is placed on the reservoir, the shank of the cover securing thumb screw is inserted in the vertical slot in the reservoir and quickly tightened to secure the cover on the reservoir.

A compressor body casting 16 is bolted on top of cover 10 and is internally threaded to receive a priming cylinder 17 which is in the form of a long tube extending substantially to the bottom of the reservoir. The casting 16 has a chamber 18 and a vertical bore or high pressure cylinder 19 in which a high pressure piston or plunger 20 moves. The lower end of high pressure cylinder 19 is closed by threaded plug 21.

The cylinder 19 is provided with an inlet passageway 22 leading to chamber 18 in the casting 16. A needle valve body 23 threaded in an inlet opening 24 leading to the cylinder 19 is provided with a needle valve 25 and a small air relief passageway 26, and forms an air bleed valve for the high pressure cylinder.

Opening into the lower end of high pressure cylinder 19 is a passageway having a reduced end portion providing a seat for an outlet check valve 27, which normally is held against said seat by means of a spring 28, and is limited in its travel by a stop forming part of a solid plug 29 which closes the end of the passageway. At right angles to, and entering the side of, the check valve passageway, is an outlet passageway or high pressure conduit 30, to which is connected a high pressure hose 31 shown in Fig. 2. The hose 31 carries at its other end a coupler 32 for connection to a lubricant receiving fitting 33 of a bearing 34 to be lubricated.

The upper end of plunger 20 is threaded into the yoke of a clevis 35, between the arms of which an operating handle 36 is pivoted by a pin 37. The operating handle 36 is provided with a hand grip 38 for lifting the compressor and cover to remove it from the reservoir 11. The end of handle 36 is pivoted on a pin 39 between the forks of a link 40 which, in turn, is pivotally connected by a pin 41 between lugs 42 of casting 16. Between the pivotal connections 37 and 39 on the handle 36, is an elongated slot 43 for receiving a pin 44, thus providing a slidable pivotal connection between the arms of a clevis 45 in which the pin 44 is pivoted, and the handle 36. The upper end of a priming piston rod 47 is securely held in the yoke of clevis 45 by a locking pin 46. The piston rod 47 extends downwardly into the priming cylinder 17 from clevis 45, through a bore in the head of casting 16, in which is disposed a packing 48 and a packing nut 49.

The piston rod 47 has adjusting nuts 50 threaded thereon, and carries at its lower end a circular backing plate 51 held thereon by a cotter pin 52. The backing plate 51 provides a seat for a coiled compression spring 53 which, at its other end, normally pushes against an upper backing plate 54. The nuts 50 are so adjusted on the priming piston rod 47 that the compression spring 53 will be under constant compression between the upper backing plate 54 and lower backing plate 51. The upper backing plate 54 is apertured and countersunk to receive two tie rods 55, the heads 56 of which are seated in the upper backing plate 54. The tie rods 55 extend downwardly inside the coiled compression spring 53 and are threaded at their lower ends into a priming piston 57.

Priming piston 57 is provided with a central bore 58, through which lubricant may flow to the priming cylinder. Normally resting on top of priming piston 57, but not secured thereto, is a circular valve plate 59 which, under the action of lubricant flowing into the priming cylinder, will move upwardly on the rods 55 against stops 60. The stops 60 may be in the form of washers pressed over striations on the tie rods 55 and thus securely held thereon.

Closely fitting the inside of the lower open end of priming cylinder 17 is a short tubular member 61 which has its side walls cut away, providing inlet openings 62, and its upper end turned over to provide a valve seat 63 for a foot valve 64. The lower end of the tubular member 61 is fitted within a shallow cup shaped base 65 which, in turn, rests in a pocket in the bottom of reservoir 11. In the base 65 is secured a headed vertical guide pin 66 carrying a spring 67 which normally urges the foot valve 64 against the valve seat 63.

A follower plate 68 has a central annular guide flange 69 adapted to engage and slide freely upon the cylinder 17. By virtue of the use of the follower plate, the lubricant within the reservoir will flow evenly toward the inlet openings 62 at the end of cylinder 17 and there will be no danger of the air piercing the body of the lubricant and forming a channel which would prevent proper flow of lubricant into the cylinder 17.

Secured to, or forming an integral part of, the bottom end of reservoir 11, is a foot platform 70 upon which the operator may stand while using the compressor, thus stabilizing the reservoir.

In operation, when the handle 36 is raised, as shown in Fig. 3, the piston rod 47 moves upwardly causing the lower backing plate 51 to urge compression spring 53 upwardly, thus raising the tie rods 55 and piston 57. When piston 57 moves upwardly, lubricant will be drawn through inlet openings 62, past foot valve 64, and into the priming cylinder 17. Upon the downward movement of operating handle 36 as piston rod 47 moves downwardly, the adjusting nuts 50 will force the upper backing plate 54 and associated tie rods 55 downwardly, and the lubricant in the lower end of the priming cylinder will be forced upwardly through bore 58 in piston 57, past valve 59 into the priming cylinder above piston 57, the foot valve 64 being closed by the action of its associated spring 67 during this operation.

Upon the upward stroke of piston 57, valve 59 will close and lubricant in the cylinder 17 above piston 57 will be forced toward chamber 18. Spring 53 will be compressed under the pressure of lubricant which has filled chamber 18 and cylinder 17. Because of the relative sizes of priming cylinder 17 and high pressure cylinder 19, priming piston 57 will continually urge more lubricant toward the high pressure cylinder than said cylinder will take; thus when the high pressure plunger moves upwardly and clears the port of passageway 22, the lubricant in the chamber 18, which is under considerable pressure from piston 57 under the action of spring 53, will quickly and with considerable force, flow into and fill the high pressure cylinder.

Upon the downward stroke of the operating handle 36, high pressure plunger 20 will force the lubricant in the high pressure cylinder 19 past check valve 27 and through the hose 31 and coupler 32 to the lubricant receiving fitting 33 of a bearing 34 to be lubricated.

In order to obtain maximum leverage on the high pressure plunger, the centers 37 and 39, i. e., the pivotal connections between high pressure plunger clevis 35 and handle 36, and between link 40 and handle 36 (the lever fulcrum), are positioned as close together as conveniently possible. And because of the relative sizes of the high pressure cylinder and the priming cylinder, it is desirable to position the pivotal connection for the priming piston rod 47 through its clevis 46 to handle 36, between the centers 39 and 37. Under these circumstances, the piston rod 47 has been cambered slightly as indicated at 71 so the piston rod 47 enters the upper part of the priming cylinder substantially vertical.

Hence, when the operating handle 36 is raised, lubricant is drawn into the priming cylinder 17 below the priming piston, and at the same time lubricant in said cylinder above the priming piston is forced into the high pressure cylinder. And, upon each downward stroke of the operating handle, lubricant in the priming cylinder below the priming piston is forced into the priming cylinder above the priming piston, and, at the same time, lubricant in the high pressure cylinder is forced past the check valve to the bearing to be lubricated.

The air bleed needle valve 26 may be used to remove air pockets from the lubricant and to bleed the air from the compressor during initial operation of the compressor while the priming cylinder is being charged.

When all of the lubricant is withdrawn from the reservoir, the cover 10, follower plate 68, compressor body and priming cylinder may be removed from the reservoir and additional lubricant supplied thereto.

Having thus described my invention, what I claim as new and desire to secure by Letters Patent of the United States, is:

1. A high pressure lubricant compressor for use in conjunction with a lubricant reservoir comprising a high pressure cylinder and a plunger reciprocable therein, a priming cylinder in communication with the high pressure cylinder, a piston rod in the priming cylinder, a backing plate on the lower end of said rod, an upper backing plate through which said piston rod extends, a spring between said backing plates and around the piston rod, tie rods held by the upper backing plate and extending downwardly therefrom, and a priming piston carried by the lower ends of the tie rods and reciprocable in the priming cylinder.

2. A high pressure lubricant compressor for use in conjunction with a lubricant reservoir comprising a high pressure cylinder and a plunger reciprocable therein, a priming cylinder in communication with the high pressure cylinder, a piston rod in the priming cylinder, an apertured backing plate on the lower end of said rod, a coiled compression spring around said rod seated against the backing plate, an upper backing plate through which the piston rod extends, said backing plate being normally urged upwardly by said spring, a piston in the priming cylinder below the piston rod, and tie rods held by the upper backing plate and extending downwardly inside the spring and alongside the piston rod through the apertures in the lower backing plate, said tie rods being secured in the piston.

3. A high pressure lubricant compressor comprising a high pressure cylinder, a plunger reciprocable therein, a priming cylinder in communication with the high pressure cylinder, a piston rod reciprocable in said priming cylinder, a backing plate fixedly secured on the lower end of said piston rod, an upper backing plate on said piston rod, a compression spring between said backing plates normally maintaining said upper backing plate spaced a fixed distance from the lower backing plate, a priming piston reciprocable in said priming cylinder, connecting means on said upper backing plate connecting it with said priming piston means to operate the priming piston and plunger simultaneously to discharge lubricant from the priming cylinder into the high pressure cylinder, a valve operable during each discharge stroke of the priming piston to admit lubricant into the priming cylinder, and a second valve in the priming piston operable during the return stroke of the priming piston for admitting lubricant to the priming cylinder above the priming piston.

4. A high pressure lubricant compressor comprising a high pressure cylinder, a plunger reciprocable therein, a priming cylinder in communication with said high pressure cylinder, a priming piston reciprocable in said priming cylinder feeding lubricant to the high pressure cylinder in excess of the discharge rate of the latter, a piston rod reciprocable in the priming cylinder, a resilient connection between said priming piston and the priming piston rod to permit independent movement of the piston rod and priming piston during the priming stroke of said piston rod when the contents of said priming cylinder are under substantial pressure, said resilient connection comprising a backing plate on the lower end of the priming piston rod, a compression spring surrounding the piston rod and seating on the backing plate, a second backing plate normally maintained in abutting relationship with a stop on said piston rod by said spring, and tie rods mounted in the second backing plate and carrying the priming piston on their lower ends.

5. In a high pressure lubricant compressor of the class described, the combination of a low pressure cylinder adapted to be connected with a source of lubricant, a piston reciprocable in said cylinder, a spring for driving said piston in a direction to discharge lubricant from said cylinder, a high pressure cylinder, a lubricant-tight conduit between said cylinders through which all lubricant discharged by said low pressure cylinder is conducted to said high pressure cylinder, a piston reciprocable in said high pressure cylinder, an outlet for said high pressure cylinder through which the lubricant is discharged, a handle for reciprocating said high pressure piston, and a connection between said handle and said spring to energize the latter during the suction stroke of said high pressure piston.

ERNEST W. DAVIS.